No. 856,499.
PATENTED JUNE 11, 1907.
W. G. TEMPLETON.
CHEESE CUTTER.
APPLICATION FILED JUNE 30, 1906.
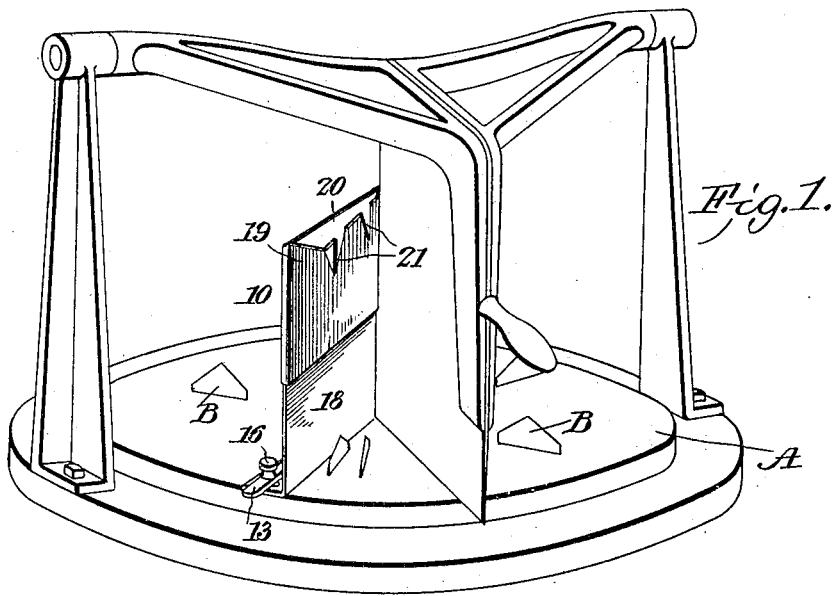
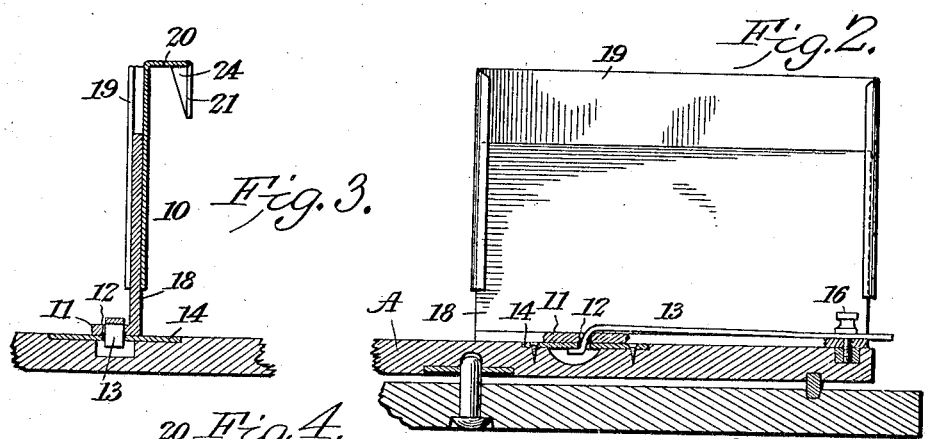
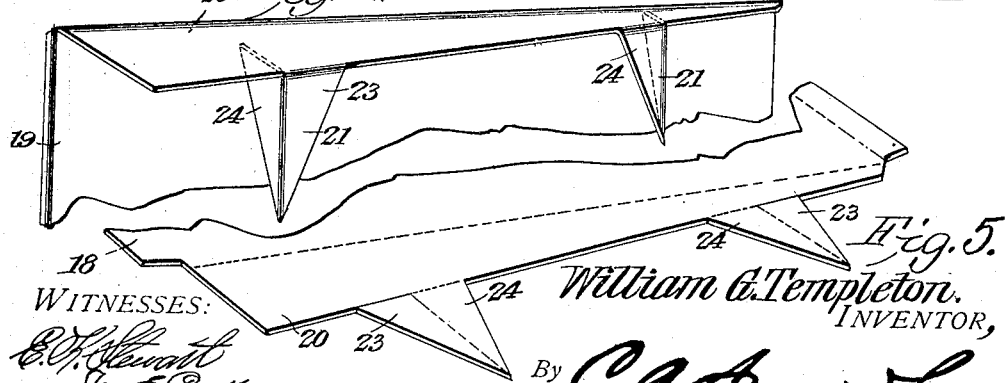
WITNESSES:
William G. Templeton.
INVENTOR,
By
ATTORNEYS

UNITED STATES PATENT OFFICE.

WILLIAM G. TEMPLETON, OF COLORADO SPRINGS, COLORADO.

CHEESE-CUTTER.

No. 856,499.  Specification of Letters Patent.  Patented June 11, 1907.

Application filed June 30, 1906. Serial No. 324,232.

*To all whom it may concern:*

Be it known that I, WILLIAM G. TEMPLETON, a citizen of the United States, residing at Colorado Springs, in the county of El Paso and State of Colorado, have invented a new and useful Cheese-Cutter, of which the following is a specification.

This invention relates to cheese cutters of that general class in which the cheese is mounted on a revoluble cutter board which is turned in order to permit the cutting of segments of any desired size and weight. In machines of this class it is found necessary to provide means for securely holding the cheese on the cutter board in order that the knife may make smooth and even cuts, and it has further been considered advisable to protect the cut end of the cheese from exposure to the atmosphere.

The principal object of the present invention is to provide an improved construction of follower or shield for the cut face of the cheese and to provide an improved form of holding support or spur which will prevent displacement of the cheese during the cutting operation, especially when only a small segment of cheese remains on the board.

A still further object of the invention is to provide holding spurs which will prevent movement of the cheese either radially or circumferentially of the cutter board without injury to the cheese.

With these and other objects in view, as will more fully hereinafter fully appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a perspective view of a cheese cutter provided with a follower or protecting shield constructed and arranged in accordance with the invention. Fig. 2 is a sectional view through a portion of the cutter board and the base flange of the follower, the latter being shown in elevation. Fig. 3 is a transverse sectional view of the follower. Fig. 4 is a detail perspective view on an enlarged scale showing the upper flange and cheese holding spurs of the follower. Fig. 5 is a detail perspective view of the blank from which the upper plate of the follower is formed.

Similar numerals of reference are employed to indicate corresponding parts throughout the several figures of the drawings.

In carrying out the invention, the cutter board A is provided with pins or spurs B, on which the cheese is impaled, these spurs presenting broad surfaces that serve to hold the cheese from revoluble movement on the board during the cutting operation.

Mounted on the board is a follower plate or shield 10 having a flanged face 11 that is provided with a suitable slot 12 for the passage of the inner end of a locking bar 13 which passes through a suitable orifice formed in a small metallic plate or disk 14 which is secured to the upper surface of the cutter board. The rear end of this locking bar carries a suitable screw 16 arranged to enter a threaded opening formed in the cutter board, or in a metallic plug inserted therein, the screw passing through an arcuate slot that is formed in the flanged face in order to allow adjustment of the follower plate with respect to the cut face of the cheese.

The follower plate is formed of two sections, the lower section 18 being formed of relatively heavy sheet metal, while the upper section 19 is somewhat lighter, and has end flanges which are guided by the ends of the lower section 18. The upper plate 19 has a horizontally disposed flange 20 that extends over a portion of the top of the cheese, and to the lower face of this flange are secured cheese impaling spurs 21 that serve to lock the follower to the cheese, and at the same time assist the lower spurs B of the cutter board in holding the cheese from rotative movement during the cutting operation.

It is found in practice that when only a small segment of the cheese remains, there is a decided tendency to displacement of the cheese, especially where the knife swings inward toward the axis of the cutter board, and to prevent this, the spurs 21 are so shaped as to positively hold the cheese from movement radially of the board, as well as preventing circumferential movement. To this end, therefore, the spurs are formed of small pieces of sheet metal bent to form two wings 23 and 24 that are approximately at a right angle to each other, the edges of said wings being tapered down toward the bending line in order to form a sharp impaling point, so that the spurs may be readily thrust down into the cheese. The flat surface 23 of the spur serves to prevent rotary movement of the cheese on the cutter board while the flat surface 24 acts to hold the cheese from movement in a direction radial of the board, so that the cheese will be firmly locked in place and clean, regular cuts may be insured.

While it is preferred to form the spurs of sheet metal and solder the same to the upper flange 20 of the follower, it should be understood that said spurs may be formed of cast metal and may be secured in place in any desired manner, or the spurs may be made to form an integral part of the upper section of the follower plate, the plate being stamped or otherwise cut so that the spurs may be formed during the subsequent shaping of said plate, as shown in Fig. 5.

I claim:—

1. A follower plate or shield for use in connection with cheese cutters, said follower plate being provided with reinforced impaling spurs presenting broad surfaces to prevent movement of the cheese in a direction radial of the cutter board.

2. A follower plate or shield having reinforced cheese impaling spurs, presenting broad surface for resisting movement of the cheese in a direction radially of the cutter board.

3. A follower or shield formed of sections, the upper of said sections having an approximately horizontal flange, and cheese impaling spurs depending from the flange, said spurs being formed of sheet metal each bent to form wings that are approximately at a right angle to each other, said wings serving to prevent circumferential and radial movement of the cheese.

4. A follower or shield formed of sections, the upper of said sections having an approximately horizontal flange, cheese impaling spurs formed integral with the flange and bent downward approximately at a right angle thereto, each of said spurs being bent to form wings that are approximately at a right angle to each other.

In testimony that I claim the foregoing as my own, I have hereto affixed my signature in the presence of two witnesses.

WILLIAM G. TEMPLETON.

Witnesses:
T. P. EVANS,
T. C. STRACHAN.